Oct. 7, 1969  A. J. MORTIMER  3,471,771

SELF-REGULATING SWITCHING CIRCUIT

Filed Feb. 2, 1967

INVENTOR
AUSTIN J. MORTIMER

BY Edward J. Norton
Attorney

# United States Patent Office 3,471,771
Patented Oct. 7, 1969

3,471,771
SELF-REGULATING SWITCHING CIRCUIT
Austin J. Mortimer, Oldwick, N.J., assignor to RCA Corporation, a corporation of Delaware
Filed Feb. 2, 1967, Ser. No. 613,512
Int. Cl. G05f 1/40, 1/52, 1/60
U.S. Cl. 323—22          5 Claims

ABSTRACT OF THE DISCLOSURE

A switching circuit for use with an alternating current source which will permit the operation of a load device independent of the magnitude of the source voltage. By properly combining a switching element, a time constant circuit which charges according to the magnitude of the source voltage, and a triggering means, the operation of the switching element can be controlled by the triggering means in response to the charge upon the time constant circuit to provide a switching circuit which is self-regulating for source voltages of various magnitudes.

---

Figure 1:
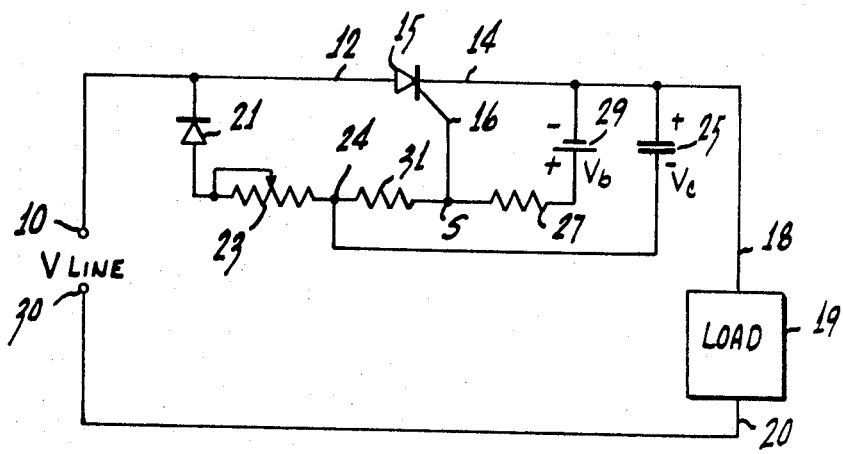

Manufacturers of electrical appliances are continuously confronted with the problem of designing their products to operate satisfactorily, within acceptable tolerances, despite variations which may occur in the magnitude of the alternating current (A.C.) supply voltage into which these appliances may be connected. Even in a limited geographical area which is theoretically supplied with alternating current at a nominal voltage level it is not uncommon for the actual voltage level, as measured at the household A.C. outlet, to vary from house to house by as much as 10 percent. These variations can result as a function of many different parameters. For example, the location of the A.C. outlet relative to the distribution circuit of the power company; or the transformer tap setting on a high voltage or distribution transformer. Greater discrepancies are not uncommon during periods when the power company may be suffering from circuit outages or generating unit shutdowns, either as a result of normal maintainence procedures or because of emergency conditions existing within their service area. On a nominal system of 110 volts this could means that the actual A.C. supply voltage at the household outlet may vary from 99 to 121 volts while on a 220 volt system the variation could be from 198 to 242 volts.

The problem is further accentuated should the consumer take the appliance from an area having one nominal voltage supply into a second area having a voltage supply of different magnitude. Travelers in Europe, for example, are often encountered with A.C. systems which may vary between 90 and 300 volts.

To alleviate the foregoing problems, particularly in the case of the latter situation, manufacturers of appliances often provide the consumer with voltage converters such that the voltage at which the appliance can be operated may be varied to accommodate the voltage supply at the area visited. This is particularly true in the case of appliances which are likely to accompany their owners on trips abroad, i.e., electric razors, travel irons, etc. The voltage converters supplied are generally nothing more than a transformer having a variety of operating taps which the consumer then manually sets in position according to the voltage level desired. Such transformers may either be mounted within the appliance or may be provided externally thereto for connection between the appliance plug and the A.C. outlet. In either case the converters have proven to be costly for the manufacturer to supply and bothersome for the consumer to use. In addition, since the operation of these converters is generally manual in nature and dependent on the knowledge and memory of the consumer, it is not unusual for the traveler to realize his oversight in neglecting to properly set the converter after he has attempted to operate the appliance at an improper level and done damage thereto.

Accordingly it is an object of this invention to provide an improved switching circuit which will permit an electrical load to be operated with supply voltages of various magnitudes.

A further object of the present invention is to provide an improved switching circuit for use with supply voltages of various magnitudes which is self-regulating and not dependent upon the memory of the user to compensate for different supply voltages.

An additional object is to provide a self-regulating circuit which is inexpensive to manufacture and easy to install into electrical appliances.

In accordance with one embodiment of this invention the anode and cathode of a silicon controlled rectifier (SCR) are connected in series with the load device to be operated and a source of alternating current. Biasing means, e.g., a battery, is connected in series with a resistor across the control electrode of the SCR and its cathode such that when the polarity of the A.C. supply voltage appearing at the anode of the SCR is positive with respect to its cathode the biasing means will trigger the SCR into its conducting state. A three-terminal time constant circuit is connected across the anode, cathode, and control electrode of the SCR in a manner whereby it charges through the load to a value determined by the magnitude of the supply voltage when the SCR is in a nonconducting state, i.e., when the polarity of the voltage at its anode is negative with respect to its cathode. Thereafter, when the polarity of the voltage across the SCR reverses, i.e., the another becomes positive with respect to the cathode, the time constant circuit must first discharge to a predetermined level before the biasing means will cause the SCR to trigger into conduction. Hence it can be seen that by varying the level to which the time constant circuit will charge (and thereby varying the discharge time before the "predetermined level" of the voltage is reached) it is possible to vary the point (conduction angle) during the positive half cycle of alternating current at which the SCR will be triggered into conduction and, since the level to which the time constant circuit will charge is a function of the supply voltage to the circuit, the amount of power to reach the load can always be maintained constant thereby assuring like circuit operation despite variation of supply voltage.

Figure 2:
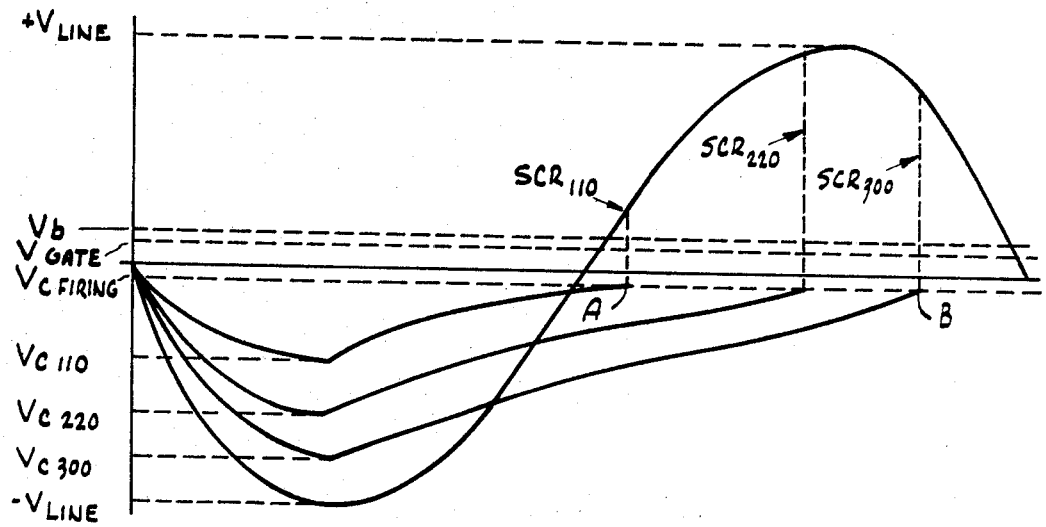

The present invention will be more fully understood when the following description is read in conjunction with the accompanying figures in which:

FIG. 1 is a circuit diagram representing one embodiment of a circuit employing the present invention; and FIG. 2 is a graphical analysis of the operation of the circuit shown in FIG. 1.

Turning now to the embodiment of the present invention as represented in the circuit of FIG. 1, one terminal 10 of an alternating current supply is connected to the anode 12 of a silicon controlled rectifier (SCR) 15. The cathode 14 of the SCR 15 is connected to one terminal 18 of the load device 19 to be served. The second terminal 20 of the load device 19 is connected to the second terminal 30 of the alternating current supply. A diode 21, a variable resistance element 23, and a capacitor 25 are connected in series in the order named across the anode 12 and cathode 14 of the SCR 15, the diode 21 being poled to conduct conventional current toward the anode 12 of the SCR 15. A resistor 27 and a biasing battery 29 are connected in series across the gate (control) electrode 16 and the cathode 14 of the SCR with the cathode 14 being connected directly to the negative terminal of the battery 29. A resistor 31 is then connected between the gate electrode 16 of the SCR 15 and the junction 24 formed by the variable resistance element 23 and the capacitor 25.

Referring now to the operation of the circuit described in FIG. 1, when the polarity of the supply voltage at terminal 10 first becomes positive with respect to terminal 30 the SCR 15 is in a forward biased condition, i.e., its anode 12 being positive with respect to its cathode 14, and the battery 29 supplies a signal to the gate electrode 16 of the SCR through resistor 27 sufficient to trigger the SCR into conduction. Once triggered into conduction the SCR continues to conduct for the remaining portion of the positive half cycle until the voltage across its anode 12 and cathode 14 reduces to zero. When the supply voltage reverses polarity the SCR becomes reversed biased and remains in a nonconducting state. During this negative half cycle, i.e., terminal 10 being negative with respect to terminal 30, diode 21 is forward biased and in a conducting state. During this negative half cycle capacitor 25 charges through the load 19, the resistance element 23, and the diode 21 to a level determined by the supply voltage (all other parameters assumed as fixed), the polarity of charge on the capacitor being opposite to the polarity of the biasing battery 29.

FIG. 2 shows the charge path $V_c$ of the capacitor 25 for supply voltages of various magnitude, e.g., $V_{c\ 110}$ corresponding to the charge path of the capacitor 25 when the line voltage is 110 volts. As the line voltage passes through its negative maximum the capacitor 25 begins to discharge from $V_c$ towards zero. Thereafter, when the polarity of the line voltage swings positive again, i.e., terminal 10 positive with respect to terminal 30, there is remaining upon the capacitor some charge as shown in FIG. 2, the magnitude of which is directly proportional to the line voltage. At this point the SCR 15 is once again forward biased and ready to be switched into its conducting state pending the application of a triggering signal to its gate 16. Resistors 31 and 27 provide a summing junction S for sensing and shifting the voltage difference between the battery 29 and the capacitor 25 ($V_b - V_c$) which controls the gate 16 of the SCR 15. The magnitude of the required triggering signal is shown in FIG. 2 as $V_{gate}$ which, in the absence of a charge upon the capacitor 25 could be supplied directly by the biasing voltage $V_b$ as in the case of the initial positive half cycle. However, before the gate 16 can receive the triggering signal ($V_{gate}$) the capacitor voltage ($V_c$) must first decay to a point ($V_{c\ firing}$), such that $V_b$ minus $V_c$ is at least equal to $V_{gate}$. As shown in FIG. 2 this point ($V_{c\ firing}$) occurs earlier during the cycle in the case of line voltages of lower magnitude (i.e. point A at 110 volts) than in the case of line voltages of greater magnitude (i.e., point B at 300 volts). Therefore, where the line voltage is supplied at 110 volts the SCR is triggered into conduction at point A and remains in a conducting state for the remaining portion of the positive half cycle thereafter occurring. Where the line voltage supplies a signal of 300 volts the SCR will not conduct until point B and thereafter will remain in conduction for the remaining portion of the positive half cycle. In the case of the 300 volt supply the load device 19 will see a greater signal for a lesser period of time. In the case of the 110 volt supply the load will see a smaller signal over a longer period of time. In either event it will be exposed to a like amount of power and the operation of the load will be independent of the magnitude of the supply voltage within the design voltage range.

By varying the value of resistance 23 the conduction angle of the SCR may be set for full half-wave conduction at any initial level of input line voltage to any load. By proper selection of circuit parameters it is possible to set the circuit such that the conduction angle will go to zero (i.e. the SCR will never conduct) at or above any predetermined maximum level of line voltage. It should be understood however that although resistance 23 is variable in nature it is intended that its value be preset by the manufacturer of the appliance such that the circuit will operate over a predetermined range of supply voltages. The variable control should not be exposed external of the appliance thereby rendering it possible for the consumer to vary the value of resistance 23. The consumers concerned need go no further than finding an A.C. outlet into which he may connect the appliance. After so doing, the regulation and operation of the appliance is fully automatic in nature.

What is claimed is:

1. A switching circuit for use with supply voltages of substantially varying magnitudes comprising:
    (a) a semiconductor device having first and second main electrodes and a control electrode, said device becoming conductive when a voltage above a first threshold value and of a positive polarity with reference to said second main electrode is applied across said first and second main electrodes and when a voltage of sufficient magnitude and of the proper polarity is applied across said control electrode and said second main electrode, said device when once conducting remaining conductive until the voltage across said first and second main electrodes reduces to a value below a second threshold value;
    (b) biasing means coupled to the control electrode of said device for triggering said device into conduction;
    (c) circuit means coupling the first and second main electrodes of said device, said circuit means including a capacitive element which unidirectionally charges to a voltage the value of which is a function of the supply voltage; and
    (d) second circuit means coupling said capacitive element to the control electrode of said device;
    the voltage across said capacitive element preventing said biasing means from triggering said device into conduction until said voltage is reduced to a predetermined value, said second circuit means serving as a discharge path for said capacitive element.

2. A switching circuit as described in claim 1 wherein said biasing means comprises a battery.

3. A switching circuit as described in claim 1 further comprising means for connecting a load device and a source of alternating current between said main electrodes of said semiconductor device.

4. A switching circuit comprising:
    (a) a silicon controlled rectifier having an anode, a cathode, and a control electrode;
    (b) a load device;
    (c) a first input terminal and a second input terminal adapted for connection to a source of alternating current, said first input terminal being connected to the anode of said rectifier, said second input terminal being connected to one terminal of said load device, the other terminal of said load device being connected to the cathode of said rectifier;
    (d) biasing means coupled to said control electrode for triggering said rectifier into conduction;
    (e) circuit means coupling said anode and said cathode of said rectifier device, said circuit means including a capacitor which charges to a voltage as a function of the supply voltage; and
    (f) second circuit means coupling said capacitor to said control electrode,
    the voltage across said capacitor preventing said biasing means from triggering said rectifier into conduction until said voltage is reduced to a predetermined value, said second circuit means serving solely as a portion of the discharge path for said capacitive element.

5. A switching circuit for use with a load comprising:
    (a) a silicon controlled rectifier having an anode, a cathode, and a control electrode;
    (b) first and second output terminals for connection to said load, (c) a first input terminal and a second input terminal for connection to a source of alternating current, said first input terminal being connected to the anode of said rectifier, said second input terminal being connected to said first output terminal, said second output terminal being connected to the cathode of said rectifier;

(d) a diode, a variable resistor and a capacitor connected in series in the order named between said anode and said cathode, the diode being poled to conduct conventional current towards said anode;

(e) a second resistor and a source of direct current connected in series in the order named between said control electrode and said cathode, said direct current source having its negative terminal connected to said cathode and its positive terminal connected to said second resistor; and (f) a third resistor connected at one end to the junction formed by said variable resistor and said capacitor, and at the other end thereof to said control electrode of said rectifier.

References Cited

UNITED STATES PATENTS 2,956,207    10/1960    Van Der Horst et al. 315—241 X
3,194,973    7/1965    Belt et al.

JOHN F. COUCH, Primary Examiner

A. D. PELLINEN, Assistant Examiner

U.S. Cl. X.R.

307—146; 315—275; 320—1; 323—39